United States Patent [19]

Iwamoto

[11] Patent Number: 4,972,879
[45] Date of Patent: Nov. 27, 1990

[54] SURGE-PRESSURE REMOVING SYSTEM FOR BACK-PRESSURE IN INJECTION CYLINDER

[75] Inventor: Norihiro Iwamoto, Zama, Japan

[73] Assignee: Toshiba Kikai Kabushiki Kaisha, Tokyo, Japan

[21] Appl. No.: 334,570

[22] Filed: Apr. 7, 1989

[30] Foreign Application Priority Data

Apr. 11, 1988 [JP] Japan .................................. 63-88387

[51] Int. Cl.$^5$ .............................................. F16L 55/04
[52] U.S. Cl. ......................................... 138/31; 138/26
[58] Field of Search .............................. 138/26, 30, 31; 164/152, 412

[56] References Cited

U.S. PATENT DOCUMENTS

| | | | |
|---|---|---|---|
| 114,683 | 5/1871 | Holly | 138/31 |
| 273,044 | 2/1883 | Edson | 138/31 |
| 586,598 | 7/1897 | French | 138/31 |
| 1,931,029 | 10/1933 | McFarland | 138/31 |
| 1,963,270 | 6/1934 | Huffman et al. | 138/31 |
| 2,393,750 | 1/1946 | Carter | 138/31 |
| 2,457,834 | 1/1949 | Ricketson | 138/31 |
| 2,884,955 | 5/1959 | Yost | 138/31 |
| 3,669,151 | 6/1972 | Fleming | 138/31 |
| 3,985,063 | 10/1976 | Lemon | 138/31 |
| 4,174,656 | 9/1979 | Duffey | 138/31 |
| 4,177,023 | 12/1979 | Kamiya et al. | 138/31 |
| 4,479,377 | 10/1984 | Jackson et al. | 138/31 |
| 4,576,159 | 3/1986 | Hahn et al. | 138/31 |
| 4,644,976 | 2/1987 | Peter et al. | 138/31 |
| 4,667,699 | 5/1987 | Lolizer | 138/31 |

Primary Examiner—James E. Bryant, III
Attorney, Agent, or Firm—Cushman, Darby & Cushman

[57] ABSTRACT

A surge-pressure removing system for backpressure in an injection cylinder, wherein a surge-pressure absorbing cylinder is connected to an oil discharge pipe communicated with the injection cylinder. A piston of this surge-pressure absorbing cylinder is located at a predetermined position by the gravity thereof or the like, and, when pressure in the oil discharge pipe is increased, the piston moves in accordance with the increased pressure to thereby prevent the surge-pressure from being generated. When the piston moves, air in the surge-pressure absorbing cylinder is discharged to atmosphere to thereby allow the piston to move more slowly.

12 Claims, 4 Drawing Sheets

SURGE-PRESSURE REMOVING SYSTEM FOR BACK-PRESSURE IN INJECTION CYLINDER

BACKGROUND OF THE INVENTION

1. Field of the Invention

The present invention relates to a surge-pressure removing system for back-pressure generated in an injection cylinder of a die cast machine when a low-speed injection region is switched over to a high-speed injection region.

2. Description of the Related Art

FIG. 5 shows a conventional example of a surge-pressure removing system in a die cast machine. In this drawing, an accumulator 29 is connected to a port 13 of an injection cylinder 11 through an oil discharge pipe 14, an on-off valve 15 and a branch pipe 18. This accumulator 29 is filled up with nitrogen gas 26, and a piston 28 is constantly biased downwards in the drawing. The on-off valve 15 is provided with pilot circuits 16 and 17. The pilot circuit 16 makes the on-off valve 15 normally closed, and the pilot circuit 17 makes the on-off valve 15 normally open. Two limit switches 19 and 20 are disposed along a moving direction of a dog 21 fixed to a piston rod 12. When the dog 21 is engaged with the limit switch 19 or 20, an injection speed switching signal for the injection cylinder 11 is output from the limit switch 19 or 20. An injection control valve 22 to be actuated in response to this signal controls a flow rate of oil from an accumulator 24 having gas 26 filled through a piston 25 thereby performs the switching control. Incidentally, designated at 23 is an oil pressure source and 27 an oil pressure tank.

With the above-described arrangement, the pressure of nitrogen gas 26 in the accumulator 29 is set by measuring the lowest surge-pressure conditions by trial operations of the die cast machine. The total sum of the fill-up pressure of nitrogen gas 26, the gravity of the piston 28, the sliding resistance and the like constantly act on the piston 28 of the accumulator 29 as a downward-directed force. However, when surge-pressure is produced in the oil discharge pipe 14, the piston 28 moves upwardly. Accordingly, when the oil pressure in the oil discharge pipe 14 abruptly rises in accordance with a change in pressure at the time the injection cylinder 11 is switched over to the high speed injection region from the low speed injection region, the oil is abruptly supplied into the accumulator 29 and, in accordance with the movement of the piston 28, nitrogen gas 26 in the accumulator 29 is adiabatically compressed, so that the surge-pressure generated in the oil discharge pipe 14 can be controlled low.

However, in the conventional surge-pressure removing system, it was a limit to reduce the surge-pressure to 70-180kg/cm$^2$. The reason seems to reside in that, since the piston in the accumulator 29 is pressurized by nitrogen gas, the piston 28 cannot instantaneously respond even if an abrupt change in pressure occurs.

SUMMARY OF THE INVENTION

It is an object of the present invention to provide a surge-pressure removing system for back-pressure in an injection cylinder wherein removal of surge-pressure can be reliably realized with a simplified arrangement.

To achieve the above-described object, the surge-pressure removing system for back-pressure in an injection cylinder according to the present invention features a surge-pressure absorbing cylinder which is connected to the oil discharge pipe communicated with the injection cylinder, and a discharge opening for discharging air in the cylinder to the atmosphere when pressure is applied to a piston of the surge-pressure absorbing cylinder, to thereby move the piston.

It is preferable that the surge-pressure absorbing cylinder is disposed such that a piston rod thereof is extended in the vertical direction, and the piston thereof is normally located at the lowest position thereof by the gravities of the piston rod and piston or through a predetermined biasing means.

A spring or a weight mounted on the piston rod is preferable as the biasing means, and such an arrangement may be preferably adopted that a pressure-reducing valve and a relief valve are additionally provided additionally at the discharge opening, the pressure-reducing valve is connected to an air pressure source, and the relief valve is opened to atmosphere.

According to the present invention, the surge-pressure absorbing cylinder is provided such that the piston thereof is positioned at the predetermined position by the gravities of the piston and piston rod or through the predetermined biasing means, and, when the piston moves in accordance with the increase in pressure in the oil discharge pipe, air in the cylinder is discharged to atmosphere, thereby allowing the piston to move smoothly. In other words, the piston is given the characteristics of being movable by a very low force, so that the surge-pressure of the back-pressure due to the change in pressure in the injection cylinder can be absorbed.

DETAILED DESCRIPTION OF THE PREFERRED EMBODIMENT

Figure 1:
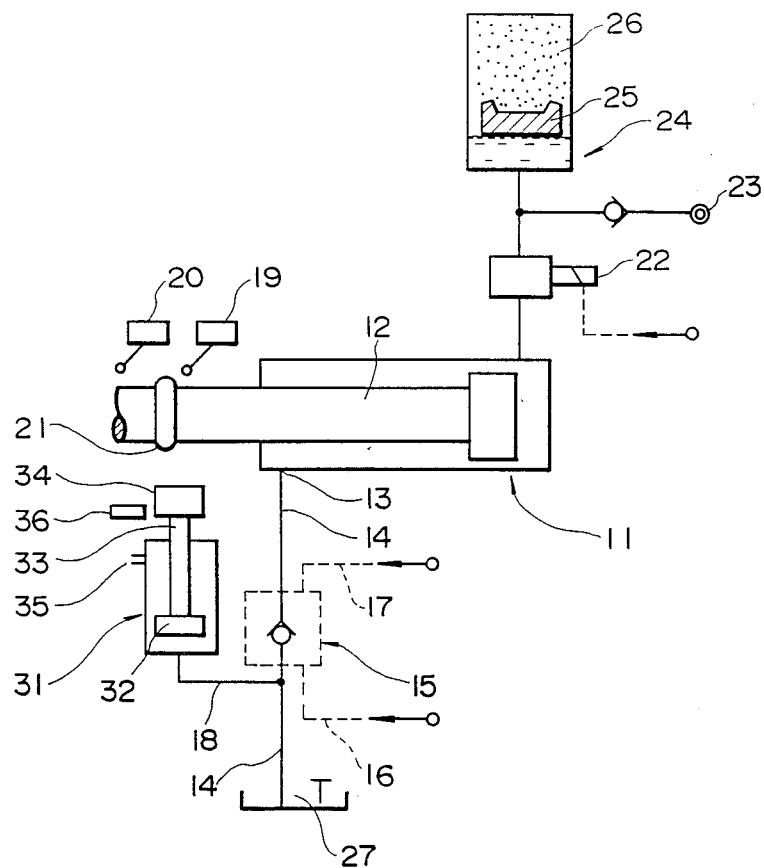
FIG. 1 is a schematic block diagram showing the general arrangement of the surge-pressure removing system for back-pressure generated in the injection cylinder according to the present invention.

Embodiments of the present invention will hereunder be described in detail with reference to the accompanying drawings. Incidentally, in the description of the following embodiments, the same reference numerals will be used to designate the same or similar components as those in the conventional example, so that description will be omitted or simplified.

In FIG. 1 in which the general arrangement is shown, a surge-pressure absorbing cylinder 31 is connected to an oil discharge pipe 14 connected to a port 13 of an injection cylinder 11. This surge-pressure absorbing cylinder 31 has a construction substantially similar to that of the conventional cylinder, and is disposed in the vertical direction in this embodiment. A piston 32 and a piston rod 33, which constitute this surge-pressure absorbing cylinder 31, are formed integrally with each other, and a weight 34 as being a biasing means is provided at the forward end (the top end in FIG. 1) of the piston rod. Accordingly, when oil pressure is not generated in a branch pipe 18 from the oil discharge pipe 14 by the total sum of the weights of the piston 32, the piston rod 33 and weight 34, the piston 32 is located at the lowest position thereof by these gravities. In this case, in consideration of the sliding resistance of the piston and the like, the total sum of these weights requires only the weight necessary for holding the piston at the lowest position thereof, so that the piston can move smoothly at the time of increased pressure. A port 35 as being a discharge opening is provided at the peripheral wall portion of the surge-pressure absorbing cylinder 31 on the side of the piston rod 33. The diameter of opening of this port 35 is relatively large, so that, when oil pressure is applied to raise the piston 32, the port 35 discharges the air in the cylinder, thus the movement of the piston can be facilitated. A switch 36 is provided on the surge-pressure absorbing cylinder 31. This switch 36 is adapted to sense the most retracted position of the piston rod 33, i.e. the piston 32 being at the lowest position in FIG. 1. Accordingly, when no back-pressure is generated in the injection cylinder 11, the piston rod 33 of the surge-pressure absorbing cylinder 31 is located at the lowest position thereof, so that, when the piston 32 is stopped at the midway, a signal of abnormality can be output.

With the above-described arrangement, when the casting cycles of the die cast machine are started, the injection cylinder 11 is switched over to a high speed injection region from a low speed injection region and the pressure in the oil discharge pipe 14 communicated with the cylinder 11 is abruptly raised, pressure is applied to the piston 32 in the surge-pressure absorbing cylinder 31 through the branch pipe 18, so that the piston 32 is raised. In this case, the air in the surge-pressure absorbing cylinder 31 is discharged from the port 35, thereby allowing the piston 32 to move smoothly.

Consequently, with the above-described arrangement of this embodiment, the surge-pressure absorbing cylinder is provided in place of the removal of the surge-pressure by the conventional accumulator, the piston 32 of this surge-pressure absorbing cylinder is located at the lowest position thereof by the gravity thereof, and, when the piston 32 is moved due to the increased pressure in the oil discharge pipe 14, the air in the cylinder is discharged from the port 35, whereby the piston is allowed to move even if the increased pressure of the piston is very low, whereby the piston moves more smoothly at the instant the low speed injection region is switched over to the high speed injection region, so that such an effect can be achieved that the surge-pressure of back pressure can be prevented from being generated.

The surge-pressure absorbing cylinder 31 of the conventional construction is provided, so that the manufacturing cost can be reduced and the present invention can be easily applied to the hydraulic circuit in the existing die cast machine.

Figure 2:
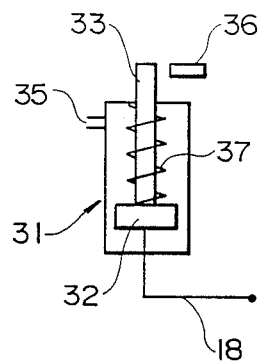
FIG. 2 is a schematic diagram showing another embodiment of the surge-pressure absorbing cylinder used in the surge-pressure removing system for back-pressure.

Incidentally, the arrangement of the surge-pressure absorbing device is not limited to the above embodiment, and, for example, the arrangement shown in FIG. 2 may be adopted. In other words, without providing the weight 34 shown in the above embodiment, a compression coil spring 37 may be mounted onto the piston rod 33 to replace the weight 34. In this case, the biasing force of the coil spring 37 is set at a value to be allowed to move freely against the sliding resistance of the piston 32. In the above-described embodiment, the surge-pressure absorbing cylinder 31 may be disposed in a direction other than the vertical direction.

Figure 3:
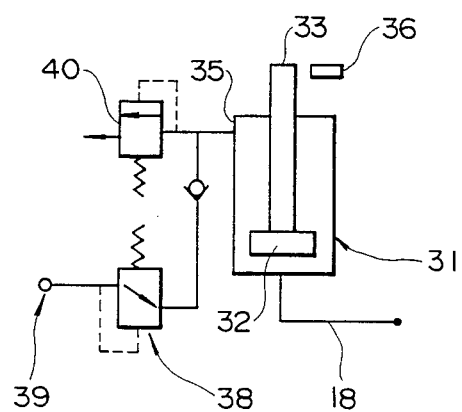
FIG. 3 is a schematic diagram showing a further embodiment of the surge-pressure absorbing cylinder.

As shown in FIG. 3, such an arrangement may be adopted that a pressure-reducing valve 38 is provided at the port 35 of the surge-pressure absorbing cylinder 31 on the side of the piston rod, this pressure-reducing valve 38 is connected to an air pressure resource 39 to supply low air pressure, the pressure fed to the cylinder from the port 35 is set about at a value to allow the piston rod 33 to be lowered against the sliding resistance of the piston 32, while, a relief valve 40 can discharge air to atmosphere at a value higher than the aforesaid pressure set for the pressure-reducing valve 38.

Figure 4:
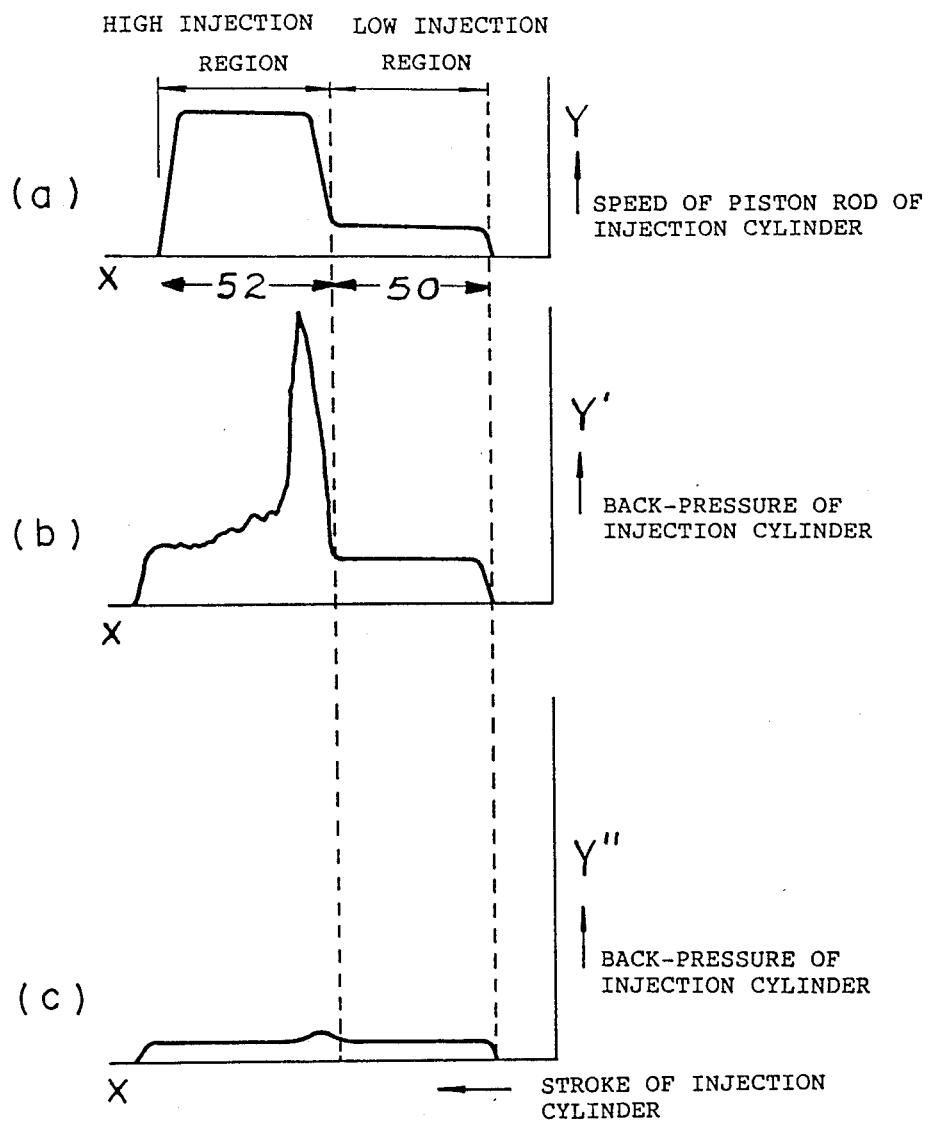
FIG. 4 is a chart of measurements showing a difference in effects between the conventional example and the present invention.
Figure 5:
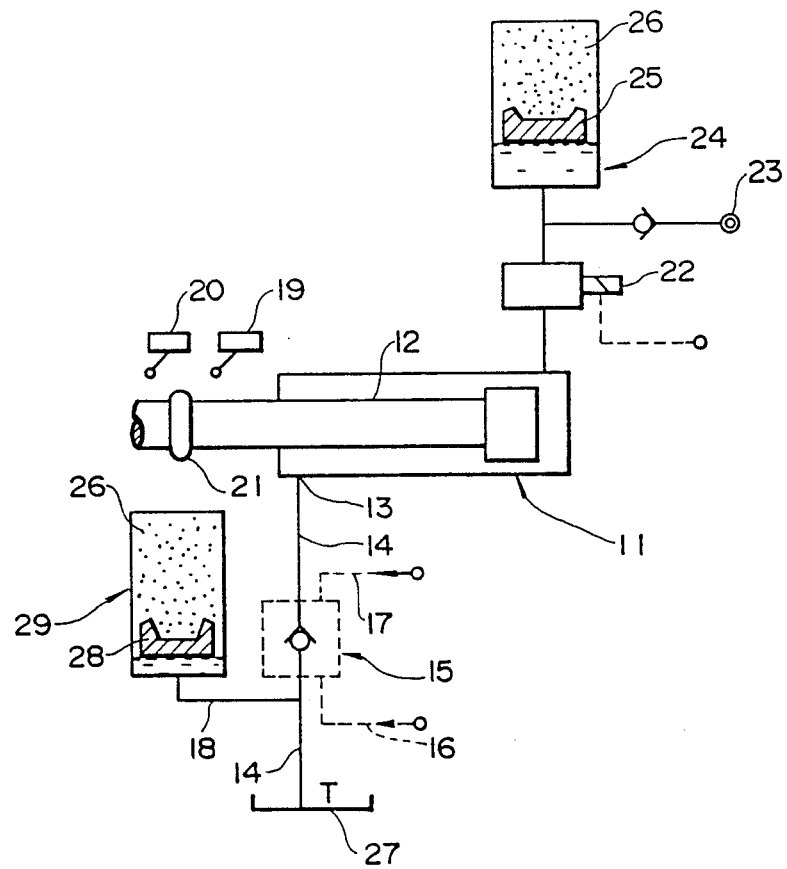
FIG. 5 is a schematic block diagram showing the general arrangement of the conventional surge-pressure removing system for back pressure.

Incidentally, FIG. 4 is the chart of measurements of comparison of the effects between the surge-pressure removing accumulator 29 in the conventional example and the surge-pressure absorbing cylinder 31 according to the present invention, which are data of oscillograph. In FIG. 4(a), the ordinate y represents the speed of the piston rod 12 of the injection cylinder 11, i.e. the injection speed (m/s) and the abscissa x represents the stroke of the injection cylinder. In FIG. 4(a), the injection speed is abruptly changed by the switching from the low injection speed region 50 to the high injection speed region 52.

FIG. 4(b) shows the oscillograph in which changes in back-pressure in the injection cylinder 11 in the conventional example, showing the relationship between the back-pressure in the injection cylinder along axis 4' and the stroke of the injection cylinder along axis x. In FIG. 4(b), the high surge-pressure (70–110 kg/cm$^2$) still remains when the low injection speed region 50 is switched over to the high injection speed region 52.

FIG. 4(c) shows the oscillograph of the effects of the surge-pressure absorbing cylinder 31 according to the present invention, showing the relationship between the back-pressure of the injection cylinder along axis y and the stroke of the injection cylinder along axis x. As shown in FIG. 4(c), it is recognized that the surge-pressure is substantially completely removed.

As apparent from the foregoing, the present invention can provide a surge-pressure removing system for back-pressure in the injection cylinder wherein the removal of surge-pressure can be reliably realized with an simplified arrangement.

What is claimed is:

1. A surge-pressure removing system for reducing back-pressure in an injection cylinder of a die cast machine when a low speed injection region is switched to a high speed injection region, the system comprising:
   an oil discharge pipe connected to said injection cylinder; and
   a surge-pressure absorbing cylinder connected to said oil discharge pipe, said pressure-absorbing cylinder including a piston and a discharge opening for discharging air in said pressure absorbing cylinder when pressure is applied to said piston causing said piston to move.

2. A surge-pressure removing system as set forth in claim 1, wherein said surge-pressure absorbing cylinder is disposed in a vertical direction and said piston is located at a lowest position relative to the gravity thereof.

3. A surge-pressure removing system as set forth in claim 2, wherein said pressure absorbing cylinder further includes means for biasing said piston to the lowest position.

4. A surge-pressure removing system for back-pressure in the injection cylinder as set forth in claim 3, wherein said biasing means is a weight connected to said piston.

5. A surge-pressure removing system as set forth in claim 3, wherein said pressure absorbing cylinder further includes a piston rod, and said biasing means is a coil spring provided on said piston rod.

6. A surge-pressure removing system for reducing back-pressure in an injection cylinder, comprising:
   an oil discharge pipe connected to said injection cylinder;
   a surge-pressure absorbing cylinder connected to said oil discharge pipe, the pressure absorbing cylinder comprising:
   a piston having a most retracted position,
   a switch capable of detecting whether said piston is at the most retracted position, and
   a discharge opening for discharging air in said pressure absorbing cylinder when pressure applied to the piston causes the piston to move.

7. A surge-pressure removing system as set forth in claim 6, wherein said pressure absorbing cylinder is disposed in a vertical direction and the piston is located at a lowest position relative to the gravity thereof.

8. A surge-pressure removing system as set forth in claim 6, wherein said pressure absorbing cylinder further includes means for biasing the piston to said most retracted position.

9. A surge-pressure removing system as set forth in claim 8, wherein said biasing means is a weight connected to the piston.

10. A surge-pressure removing system as set forth in claim 8, wherein said pressure absorbing cylinder further includes a piston rod, and said biasing means is a coil spring provided on said piston rod.

11. A surge-pressure removing system for reducing back-pressure in an injection cylinder, comprising:
   an oil discharge pipe connected to said injection cylinder;
   a surge-pressure absorbing cylinder connected to said oil discharge pipe, the pressure absorbing cylinder comprising:
   a piston having a most retracted position, and
   a discharge opening for discharging air in said pressure absorbing cylinder when pressure applied to the piston causes the piston to move;
   a pressure reducing valve having a first end connected to said discharge opening and a second end connected to an air pressure source; and
   a relief valve having a first end connected to the discharge opening and a second end open to an atmosphere.

12. A surge-pressure removing system as set forth in claim 11, wherein said pressure absorbing cylinder further comprises a switch for detecting the most retracted position of the piston.

* * * * *